SUBSCRIPTION TELEVISION SYSTEM

Filed Dec. 15, 1952 4 Sheets-Sheet 1

JACK E. BRIDGES
*INVENTOR.*

BY *Francis W. Crotty*

HIS ATTORNEY.

JACK E. BRIDGES
INVENTOR.
BY Francis W. Crotty
HIS ATTORNEY.

JACK E. BRIDGES
*INVENTOR.*
BY Francis W. Crotty
HIS ATTORNEY.

SUBSCRIPTION TELEVISION SYSTEM

Filed Dec. 15, 1952 4 Sheets-Sheet 4

JACK E. BRIDGES
*INVENTOR.*

BY Francis W. Crotty

HIS ATTORNEY.

United States Patent Office 2,823,252

Patented Feb. 11, 1958

2,823,252

SUBSCRIPTION TELEVISION SYSTEM

Jack E. Bridges, Franklin Park, Ill., assignor to Zenith Radio Corporation, a corporation of Illinois Application December 15, 1952, Serial No. 326,107

14 Claims. (Cl. 178—5.1)

Figure 1:
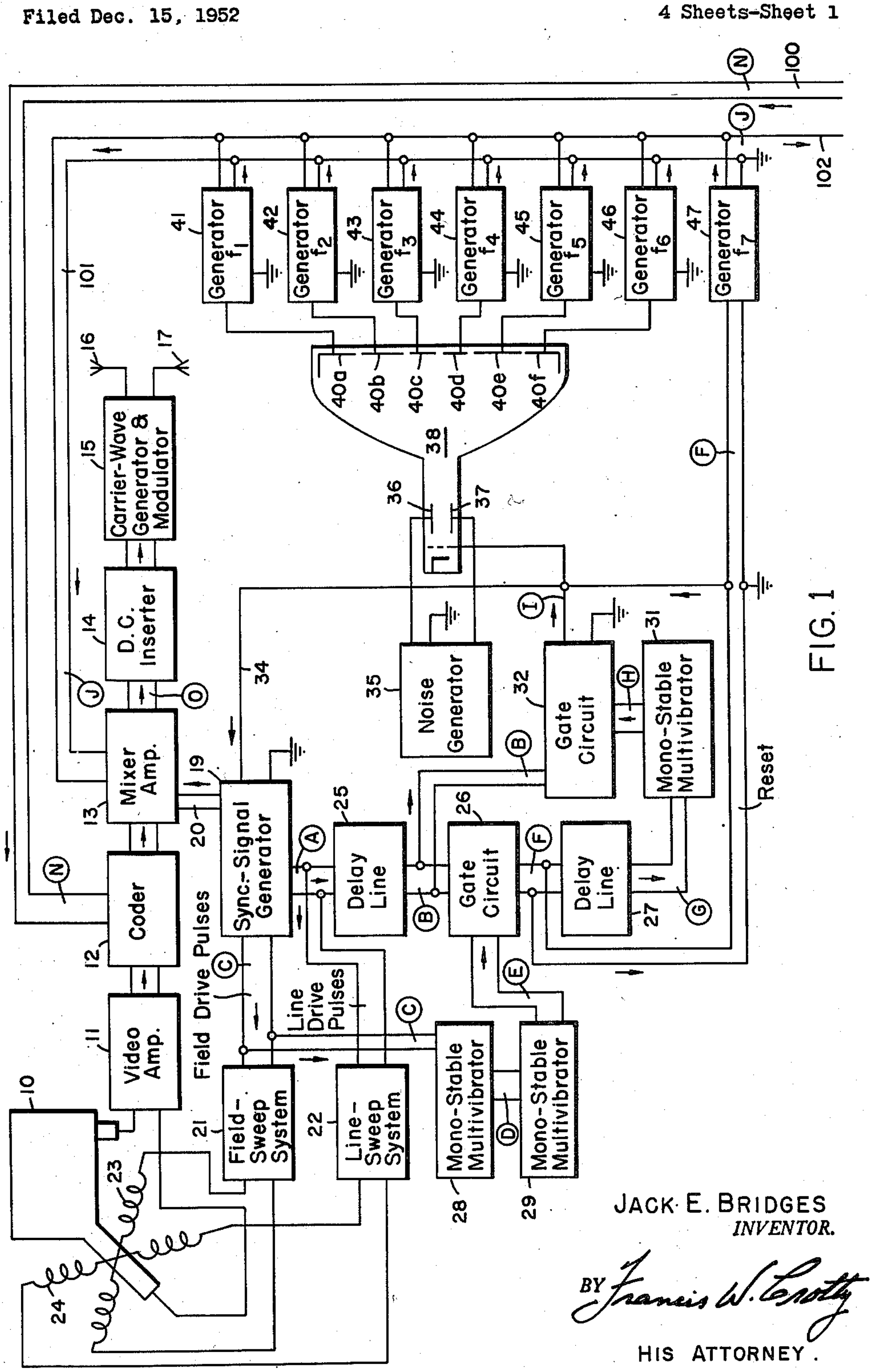

This invention relates to subscription television systems in which a television signal is transmitted in coded form to be utilized only in subscriber receivers having appropriate decoding apparatus actuated in accordance with the coding schedule employed at the transmitter.

Since the invention may be practiced in either a transmitter or receiver, the term "encoding" has been used herein in its generic sense to encompass either coding at the transmitter or decoding at the receiver.

Subscription television systems have been proposed in which a television signal is coded in accordance with a selected coding schedule at the transmitter, and in which a key signal indicating the coding schedule of the telecast is made available to subscriber receivers, being disseminated, for example, over a signal channel such as a closed wire circuit. Systems of this general type are disclosed and claimed in Patent 2,510,046, issued May 30, 1950, in the name of Alexander Ellett et al. and in Patent 2,547,598, issued April 3, 1951, in the name of Erwin M. Roschke, both of which are assigned to the present assignee.

The use of a closed wire circuit for distributing the key signal to subscriber receivers is advantageous in that it provides maximum secrecy and facilitates the assessment of subscription fees. Nevertheless, the key signal may be transmitted as a modulation component of the coded television signal itself or it may be sent over any other ether channel. However, when this expedient is resorted to, the key signal schedule of the telecast may be too easily appropriated by unauthorized persons for decoding purposes. Copending application Serial No. 281,418, filed April 9, 1952, in the name of George V. Morris et al., entitled "Subscription Television System," and assigned to the present assignee, discloses and claims one form of subscription television system in which an air-borne key signal is distributed to subscriber receivers but it conveys coding information in transposed form so that a compensating transposition must be made at the receivers before it may be used for decoding purposes. Such a coded key signal may be distributed as a modulation component of the coded television signal without any great possibility of its being used by unauthorized receivers. The specific embodiments of the Morris et al. application effect mode changes of the television system and accomplish encoding in response to pulses that are selected, in accordance with an encoding schedule, and in each of a series of mode-determining intervals in which there is a determination of operating mode.

In copending application Serial No. 310,309, filed September 18, 1952, in the name of Alexander Ellett, entitled "Subscriber Television System," and assigned to the present assignee, there is disclosed and claimed another subscription television system featuring an air-borne key signal. In that system a series of code-conveying signal pulses, transmitted at different carrier frequencies to facilitate their selection and segregation, is employed selectively to operate various stages of a multi-stage pulse counter such as a binary counting chain. Preferably, at least certain of the code pulses occur with a random time pattern so that the effective count of the chain, which is actuated by such pulses, varies at an irregular rate. Mode changes occur in the television system each time the counting chain registers a predetermined count and in this manner the operating mode is changed at irregular or random intervals. This code technique is adequate and effective. The described arrangements do permit the use of an air-borne code conveying signal while preserving an adequate degree of secrecy, but it is desirable to improve the coding technique. In the present case, secrecy is improved by adding another degree of freedom which has the decided advantage of reducing the number of frequency channels required for the code-conveying pulses. And yet, the subject invention provides a simplification of circuitry that enables an operation, similar to that of the binary counting chain, to be achieved with a considerable reduction in the number of circuit components.

It is, accordingly, an object of the present invention to provide an improved and simplified encoding arrangement for a subscription television system of the general type disclosed by Morris et al. and Ellett.

It is another object of the invention to provide a novel generator for developing a combination of code signal components individually having a predetermined identifying characteristic and collectively determining a code schedule.

A subscription television system, in accordance with the present invention, comprises a secrecy mechanism having a plurality of operating conditions each of which establishes a different operating mode in the system. A multi-stable actuating device provided for that mechanism has at least two stable operating conditions. The actuating device has at least three input circuits that are individually differently responsive to an actuating signal to operate the actuating device from one to another of its operating conditions. In order to select the particular operating modes of the system, means are provided for deriving a combination of code signal components individually having a predetermined identifying characteristic and collectively determining a code schedule. Finally, the system includes means for utilizing the code signal components to apply actuating signals to the input circuits for effecting actuation of the actuating device between its operating conditions to vary the operating condition of the secrecy mechanism.

Figure 2:
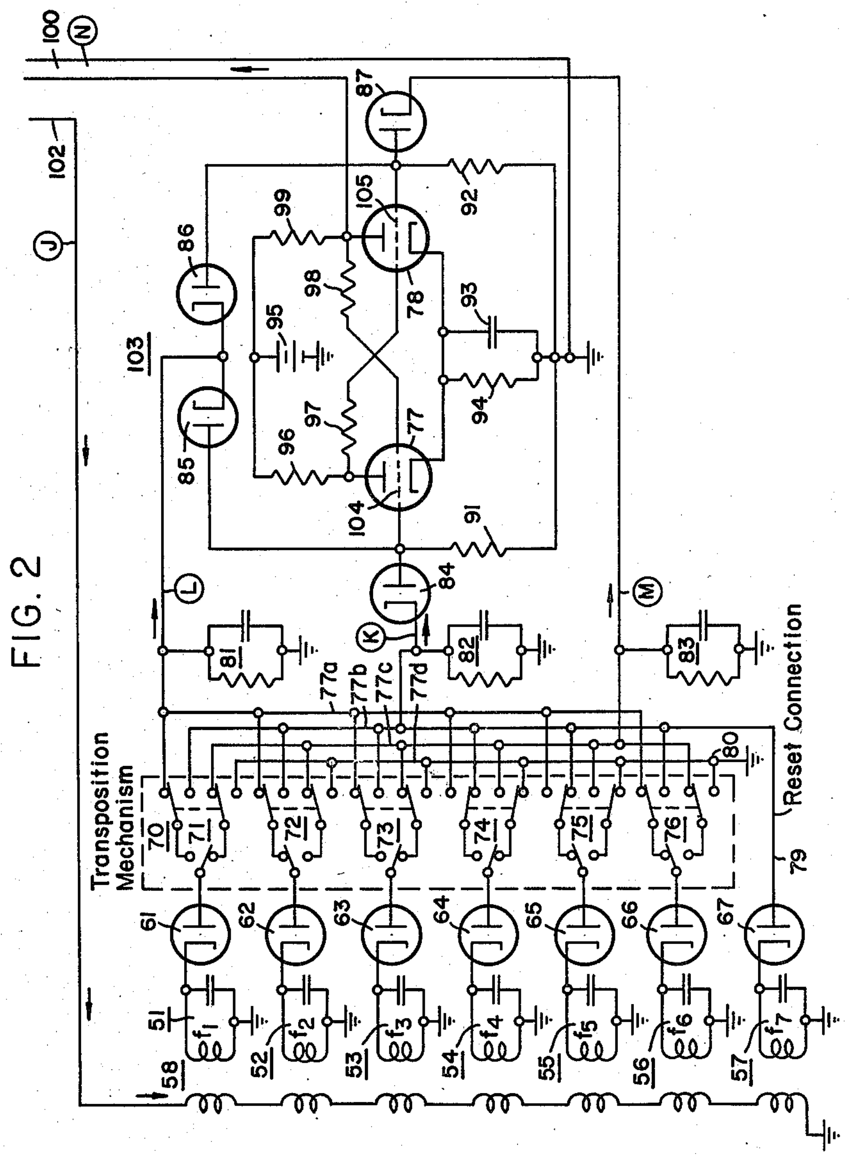
Figure 3:
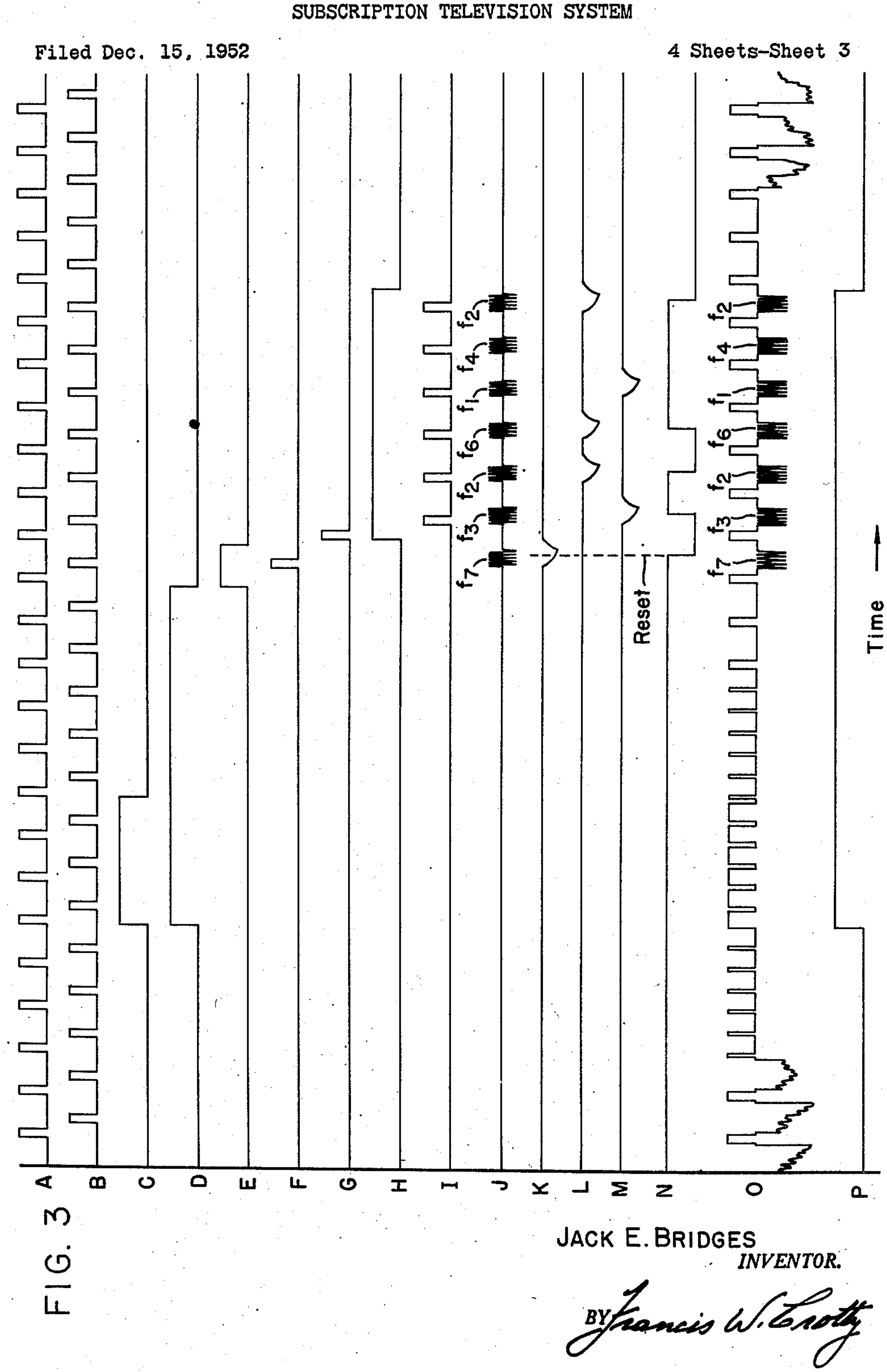
Figure 4:
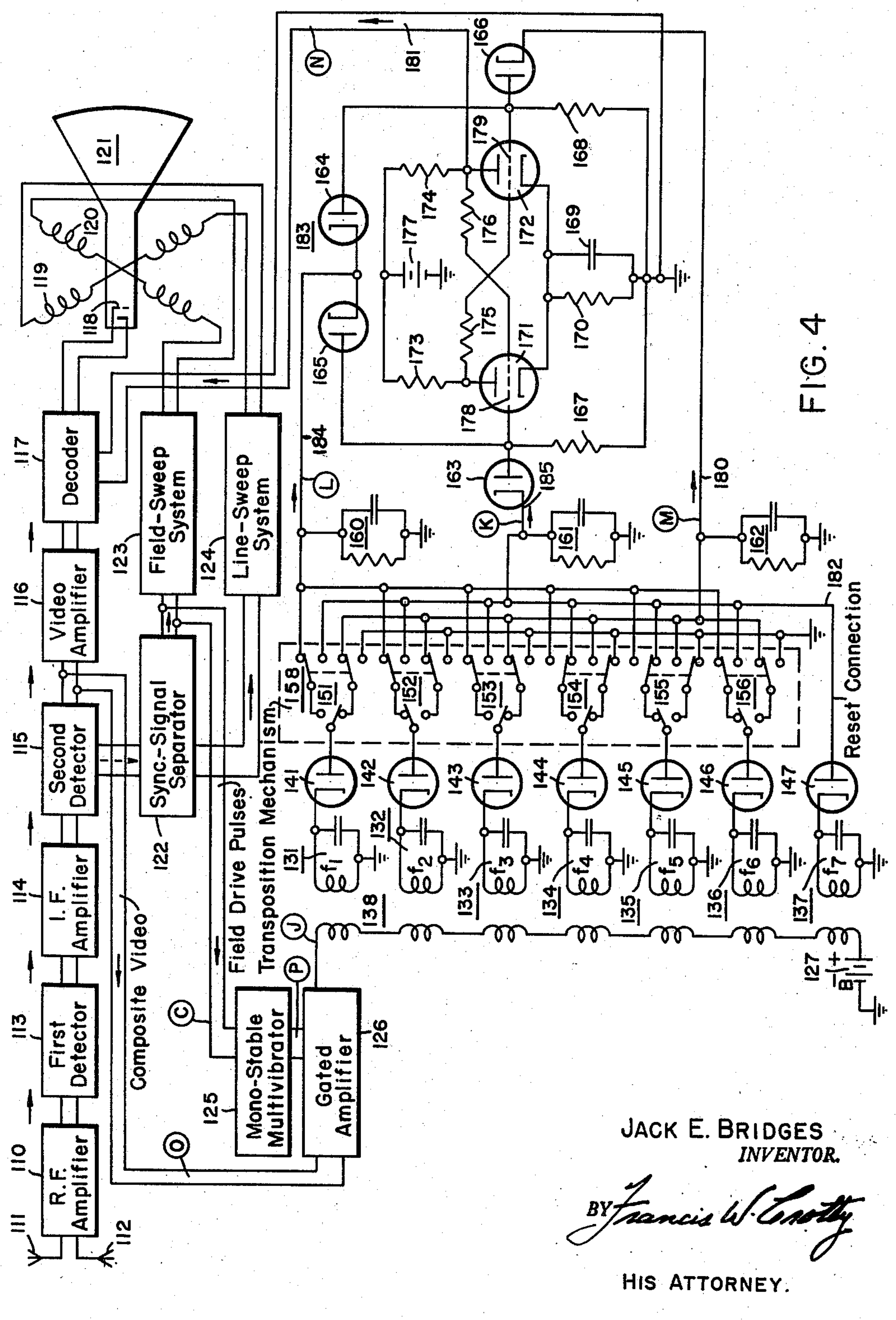

The features of this invention which are believed to be new are set forth with particularity in the appended claims. The invention, however, together with further objects and advantages thereof, may best be understood by reference to the following description in conjunction with the accompanying drawings, in which:

Figures 1 and 2 combined, with Figure 2 being placed immediately below Figure 1, represent a subscription television transmitter constructed in accordance with the invention, Figure 3 is a family of curves used in explaining the operation of the system, and, Figure 4 represents a receiver for operation in conjunction with the transmitter of Figures 1 and 2.

The transmitter of Figures 1 and 2 includes a picture-converting device 10 which may be an iconoscope, image orthicon or other well-known type. The output terminals of device 10 are connected through a video amplifier 11 and a secrecy mechanism or coder 12 to the input terminals of a mixer amplifier 13. Secrecy mechanism 12 may be similar to that disclosed and claimed in copending application Serial No. 243,039, filed August 22, 1951, and issued August 7, 1956 as Patent 2,758,153, in the name of Robert Adler, entitled "Subscription Television System" and assigned to the present assignee. It may comprise a beam-deflection tube having a pair of output circuits which may be selectively coupled into the video channel as the electron beam thereof is deflected from one to the other of two segmental anodes coupled to such output circuits. One of these circuits includes a time-delay network so that the timing of the video components relative to the synchronizing components of the radiated signal varies as the beam of the deflection tube is switched between its anodes. This switching effect is accomplished by means of a beam-deflection control or actuating signal applied to coder 12, as explained hereinafter. Such intermittent variations in the relative timing of the video and synchronizing components effectively codes the television signal since conventional television receivers, not equipped with suitable decoding apparatus, depend upon an invariable time relation of the video and synchronizing components of a received signal to reproduce the image intelligence represented thereby.

Viewed from the standpoint of operating modes, secrecy mechanism or coder 12 has two stable operating conditions each of which imposes a different operating mode on the transmitter. In the first operating condition, coder 12 extends the video channel from amplifier 11 to mixer 13 without introducing any material delay and in this condition the transmitter operation is conventional particularly in respect of the time relation between the video and synchronizing components of the radiated signal. In its second operating condition, secrecy mechanism 12 introduces a time delay in the video channel and the transmitter then functions in an abnormal mode since the video and synchronizing components of the radiated signal have an abnormal time relation with respect to one another.

Mixer amplifier 13 is connected through a direct-current inserter 14 to a carrier-wave generator and modulator 15 which, in turn, is connected to an antenna 16, 17. The transmitter also includes a synchronizing-signal generator 19 which supplies line- and field-synchronizing components and associated pedestal components to mixer 13 over leads 20. Generator 19 further supplies field- and line-drive pulses to a field-sweep system 21 and to a line-sweep system 22, respectively. The output terminals of sweep systems 21 and 22 are connected to the field-deflection elements 23 and line-deflection elements 24, respectively, associated with picture-converting device 10.

Generator 19 additionally supplies field-drive pulses to a mono-stable multivibrator 28 to produce an elongated pulse of a predetermined duration in response to each applied field-drive pulse. The output terminals of multivibrator 28 are connected to a mono-stable multivibrator 29 which is actuated from its normal operating condition to its abnormal condition in response to the trailing edge of the output pulse from multivibrator 28 to develop an output pulse of a predetermined time duration. The output signal from multivibrator 29 is, in turn, applied as a gating signal to a normally-closed gate circuit 26.

Generator 19 also supplies line-drive pulses to a delay line 25 having output terminals connected to another input circuit of gate circuit 26 and further connected to an input circuit of another normally closed gate circuit 32. The output terminals of gate circuit 26 are connected directly to a generator 47, through a second delay line 27 to another mono-stable multivibrator 31, and over a conductor 34 to synchronizing-signal generator 19. The output terminals of multivibrator 31 are connected to the input terminals of gate circuit 32 to establish a gating signal therefor. The output signal of circuit 32 is also applied to synchronizing-signal generator 19 over conductor 34 and is supplied to a control grid of a beam-deflection device 38 to modulate the electron beam therein, energizing or "turning on" the beam for the duration of each applied signal pulse.

Beam-deflection device 38 includes a pair of deflection elements 36, 37 which are connected to the output terminals of a noise generator 35. This generator produces a signal having an instantaneous, frequency that varies in random fashion over a suitable bandwidth and may vary in amplitude from one operating instant to the next. This signal, as applied to deflection electrodes 36, 37 establishes an alternating beam-deflection field within tube 38 having a peak-to-peak amplitude sufficient to sweep the beam (if it is energized) back and forth across a family of anode segments **40*a*—40*f* at a rate corresponding to the instantaneous frequency of the output signal of generator 35**.

The load circuits for the several segmental anodes **40*a*—40*f* are completed through control circuits of a series of additional generators 41—46, respectively. This coupling from the anode elements to the generators permits each generator to be turned on or energized by a current pulse resulting from the impingement of the beam in device 38 upon the associated anode segment. Each of the generators 41—47 includes a cycling or timing feature in the manner of a blocking oscillator or other monostable generator to determine the duration of the interval during which the generator is energized in order that the output obtained therefrom may have a selecetd duration, exceeding that of the current pulse delivered by its associted anode segment but less than the time separation of successive line-synchronizing pulses. Moreover, each of the generators 41—47** has a distinct, assigned operating frequency as indicated by the indicia $f_1$—$f_7$ to facilitate frequency selection or separation of the outputs from such generators.

The respective areas of the segmental anodes are so chosen that each receives the same average current as the electron-beam is swept under the control of the signal applied to deflection elements 36, 37. The beam is thus directed to each of the anodes for an equal proportion of each program interval and has a substantially equal probability of impinging on any one of the six anodes each time the beam is gated on under the control of unit 32.

The beam-deflection device, the circuits provided for controlling the intensity and sweep of the electron beam of the device, and the generators coupled to the anode segments thereof, collectively constitute means for deriving a combination of code signal components individually having a predetermined identifying characteristic (frequency) and collectively determining a code schedule. Their conjoint operation in that respect will be considered in more detail hereinafter. This encoding signal generating arrangement is disclosed and claimed in copending divisional application Serial No. 486,135, filed February 4, 1955, in the name of Jack E. Bridges, and assigned to the present assignee. It is convenient to utilize frequency as the identifying characteristic of the output signals of generators 41—47 although other characteristics such as pulse width and amplitude are also suitable.

The output terminals of generators 41—47 are connected to a pair of input terminals of mixer amplifier 13 over conductors 101 and, by means of a ground connection and conductor 102, to the primary winding of a transformer 58 which may be sectionalized, as illustrated. Means responsive to the identifying characteristics of the code signal components are provided for separating these components from one another. This means includes a series of secondary windings of transformer 58 which constitute the inductive portions of a corresponding series of frequency-selective tuned circuits 51—57, each such circuit being resonant at a particular one of the frequencies $f_1$—$f_7$. The frequency-selective circuits, with the exception of circuit 57, are connected through diode rectifiers 61—66 to a transposition mechanism 70 while frequency-selective circuit 57 is connected through a diode rectifier 67 to a reset connection 79. The transposition mechanism 70 includes a series of switching devices 71—76, one for each of the selector circuits 51 to 56, respectively. Each such switching device comprises a first switch blade connected to the anode of the diode in circuit with its selector and adjustable to engage either of two contacts. Each of these contacts, in turn, is connected to second and third switch blades individually adjustable to engage either one of a further pair of terminals so that the circuit may be extended from the input terminal of the switching device to any one of four output terminals in accordance with the adjustment of the first, second and third switch blades. The second and third blades of each switching device are mechanically interconnected, as represented by the broken construction line, for unicontrolled action in respect of their contact pairs. Corresponding output terminals of the switching devices are interconnected by conductors *77a*—*77d*. Conductors *77a*—*77d* extend the circuits from the active output terminals of the switching devices to resistance-capacitance diode load circuits 81, 82, or 83 or, alternatively, to a ground connection 80.

The described circuitry of transposition mechanism 70 permits selective control of a multi-stable actuating device 103 provided for supplying a beam-deflection signal to secrecy mechanism 12 to effect actuation thereof and coding. As shown and as will be described presently, the actuating device has two stable operating conditions resulting from the use of a pair of electron discharge devices 77 and 78 cross-coupled, one to the other, to be rendered conductive in alternation. If desired, a ring circuit may be used in the actuating device to provide a larger number of stable operating conditions therefor and increase the flexibility as well as the capability of the coding technique. The use of a multi-stable actuator having a large number of stable operating conditions further reduces the number of frequency channels required for coding. Considering now more particularly the form of actuator represented, it comprises a pair of electron-discharge devices 77 and 78, the anode of device 77 being cross-coupled to the control electrode 105 of device 78 through a resistor 97 and the anode of device 78 being cross-coupled to the control electrode 104 of device 77 through a resistor 98. The anodes of devices 77 and 78 are connected through resistors 96 and 99, respectively, to a source of unidirectional operating potential 95 and the cathodes of the devices are connected in common through the parallel combination of a resistor 94 and a capacitor 93 to a ground connection.

The actuator has three input circuits for differently controlling the respective conductive conditions of the discharge paths to determine the operating condition of the actuating device. One input circuit, coupled to the grid 104 and cathode of tube 77 to control the conductivity thereof, comprises a diode 84 connected between the high-potential terminal of network 82 and a resistor 91. A second input circuit for controlling the conductivity of tube 78 comprises a diode 87 and a resistor 92 coupled in similar fashion in respect of the high-potential terminal of network 83 and grid 105 of tube 78. The third input circuit extends from the high-potential terminal of network 81 through one diode 85 to grid 104 of tube 77 and, alternatively, through another diode 86 to grid 105 of tube 78. The anode of tube 78 is connected to coder 12 over conductors 100 to provide an actuating or deflection-control signal therefor having amplitude variations representing a coding schedule and determined by variations in the operating condition of actuator 103. Thus, transposition mechanism 70 constitutes means for selectively applying the separated encoding signal components to the input circuits of the actuator in a prescribed sequence to actuate it and vary the operating condition of the encoding mechanism effectively to encode the television signal.

It is desirable in the particular system illustrated to restore actuating device 103 to a reference operating condition at predetermined times and to that end reset connection 79 permanently connects frequency-selector 57 to the first-described input circuit of device 103 by way of conductor **77*b***.

In considering the operation of the described transmitter, the technique of coding will be disregarded initially. Picture-converting device 10 produces video-frequency components representing the program information to be televised and these components, after amplification in amplifier 11, are supplied through coder 12 to mixer amplifier 13. The mixer also receives the usual line- and field-synchronizing and blanking pulses from generator 19 so that a composite television signal is developed therein. That signal is adjusted as to background level in direct-current inserter 14 and is amplitude modulated on a picture carrier in unit 15. The modulated video carrier is supplied to antenna 16, 17 for transmission to subscriber receivers. It will, of course, be understood that in the generation of the video-frequency components sweep systems 21 and 22 are synchronized by the field- and line-drive pulses applied thereto by generator 19. As in any television broadcast, the accompanying audio information is modulated on a sound carrier and concurrently radiated. However, the sound system may be entirely conventional and since it constitutes no part of the instant invention, it has not been illustrated in order to avoid unnecessarily encumbering the drawing.

It is necessary in any commercial subscription system to code the video signal, and preferably the sound signal as well, to prevent pirating or unauthorized used of the program material. Briefly, coding of the video portion of the broadcast is accomplished by secrecy mechanism or coder 12 under the influence of a deflection-control signal which switches the beam thereof back and forth between its two segmental anodes in accordance with a coding schedule represented by amplitude variations of that signal. As previously explained, this actuation of the coder varies the operating mode of the transmitter, modifies the time relation of the video and synchronizing components of the radiated signal, and achieves coding. Consideration will now be given to the particular manner in which the telecast is coded in accordance with the present invention.

Periodically recurring line-drive pulses, shown in curve 3A, are supplied from generator 19 to delay line 25 to establish the pulses of curve 3B. This line is terminated in its characteristic impedance and exhibits a delay exceeding the duration of the line-drive pulses but substantially less than the time separation of such pulses. Simultaneously with the application of line-drive pulses to delay line 25, periodically recurring field-drive pulses, shown in curve 3C, are applied to multivibrator 28. The leading edge of an applied field-drive pulse actuates the multivibrator from its normal operating condition to an abnormal operating condition and the multivibrator automatically returns to its normal condition after a selected time interval determined by its internal cycling circuits to produce the pulse of curve 3D. The parameters of the multivibrator are so chosen that the trailing edge of this pulse occurs during the field-retrace time of the system, at a point following the equalizing pulses which succeed the serrated field pulse in present-day practice. This output signal is applied to mono-stable multivibrator 29 which responds to the trailing edge thereof and produces a gating pulse, shown in curve 3E. The parameters of multivibrator 29 are so chosen that this pulse overlaps, in point of time, one pulse from delay line 25. Gate circuit 26 receives the gating pulse as well as delayed line-drive pulses from delay line 25 and responds to their coincident effect to translate a pulse (curve 3F) to generator 47. This generator is energized by the applied pulse and develops a burst of signal of frequency $f_7$ having a time duration exceeding the duration of the actuating pulse but less than the time separation of successive line-synchronizing pulses. This signal burst of frequency $f_7$ produced at the output terminals of unit 47 is for reset purposes and is shown in curve 3J. The utility of this reset burst will be shown hereinafter.

The output signal from gate circuit 26 (curve 3F) is also delayed in delay line 27 which is terminated in its characteristic impedance and which exhibits such a delay that its output pulse, shown in curve 3G, follows the trailing edge of the pulse of curve 3F. The delayed output pulse is applied to mono-stable multivibrator 31, producing a gating pulse, shown in curve 3H for gate circuit 32. The parameters of multivibrator 31 are so chosen that its output pulse (curve 3H) overlaps, in point of time, the number of delayed line-drive pulses (curve 3B) to be employed in coding—six for the case in question. Delayed line-drive pulses are continuously supplied from delay line 25 to gate circuit 32 and those which occur within the duration of the gating pulse are translated to beam-deflection device 38. The translated pulses, shown in curve 3I, intensity modulate the beam, turning the beam on so to speak for the duration of each such pulse. At the same time, the variable amplitude sweep signal impressed on deflection elements 36, 37 by noise generator 35 creates a deflection field varying at a random rate to scan the beam back and forth across segmental anodes 40*a*—40*f*. Each time a pulse of curve 3I is applied to the control electrode, a pulse of current flows in the circuit of one of the segmental anodes to turn on the one of generators 41—46 that is coupled thereto. In the present illustration, for example, it will be assumed that at the time the first pulse of curve 3I occurs, the beam is incident anode 40*c* and thus generator 43 produces a burst of signal of frequency $f_3$. It will further be assumed that as the succeeding pulses of curve 3I occur, generators 42, 46, 41, 44, and 42, are "turned on" in the recited order, producing corresponding bursts of signal of frequencies $f_2$, $f_6$, $f_1$, $f_4$, and $f_2$, as shown in curve 3J. A combination of coding signal components of various frequencies is thus established, the components being randomly-sequenced and randomly-appearing within their combination.

These code signal components are impressed on the primary winding of transformer 58 and are selected by means of frequency-selectors 51—57. In other words, the first burst of signal of frequency $f_7$ is segregated by selector 57, the second burst of signal of frequency $f_3$ is segregated by selector 53, the third burst of signal of frequency $f_2$ is chosen by selector 52, and so on. Assuming that transposition mechanism 70 is adjusted as illustrated, selector 51 is coupled through diode 61 and switching element 71 to load circuit 83; selector 52 is coupled through diode 62 and switching element 72 to load circuit 81; selector 53 is coupled to load circuit 83; selector 54 is coupled to ground; selector 55 is coupled to load circuit 82 and selector 56 is coupled to load circuit 81. Thus, the reset pulse shown in curve K is developed in network 82 in response to the burst of signal frequency $f_7$; the pulses of curve L are developed in network 81 in response to the two bursts of signal frequency $f_2$ and the single burst of signal frequency $f_6$; and the pulses shown in curve M are developed in network 83 in response to the burst of signal frequency $f_3$ and the burst of signal frequency $f_1$. It will be noted that the burst of signal frequency $f_4$ is channeled directly to the ground and develops no signal potential in the load circuits.

It is thus seen that the transposition mechanism receives a particular combination of coding signal components (curve 3J) and transposes that combination into a different effective combination (curves K, L and M) determined by the adjustment of its switch elements 71 to 76 which direct the pulses of the first combination in respect of the input circuits of the bi-stable actuating device 103. In considering the transposition effected by mechanism 70 it will be manifest that the distribution of the coding pulses in respect of the input circuits of actuating device 103 is particularly significant in determining the final coding pattern. The specific setting of transposition mechanism 70 may be changed at will although it is convenient to adjust the mechanism at the start of a program and maintain it throughout the program. The switch setting information is disseminated only to subscriber receivers and a suitable charge may, of course, be assessed for such information.

Consider that in the first or reference operating condition of actuator 103, tube 77 is non-conductive and tube 78 is highly conductive; further consider that in the second or alternative operating condition, tube 77 is highly conductive and tube 78 is non-conductive.

In describing the effect of the transposed signal components upon actuator 103, it will be assumed initially that the actuator is in its second operating condition at the start of the mode-determining interval. The reset pulse of curve 3K which is received first is applied to control electrode 104 of device 77. The reset pulse biases device 77 to cut-off and the cross-coupling causes device 78 to be conductive, thus establishing the reference operating condition in the actuator. If actuating device 103 is in its reference condition at that time the reset pulse has no effect at all. In this manner, the actuator is certain to be in its reference condition at the beginning of each combination of coding signal pulses; the period for the combination may be called a mode-determining interval inasmuch as the combination determines the particular mode of operation of the system for the succeeding field-trace interval, in the particular illustration.

The next pulse, which is the first component of curve 3M, is applied from network 83 to control electrode 105 and causes device 78 to become cut-off which, in turn, renders device 77 conductive. The actuator is thus triggered to its second operating condition. The next succeeding pulse of the coding combination which is the first pulse of curve 3L is impressed simultaneously on both control electrodes 104 and 105 from network 81. Device 78 being already cut-off is not affected by the negative signal on its control electrode 105, whereas device 77 being in its conductive state is rendered non-conductive and device 78 then becomes conductive. The next succeeding pulse of the coding combination, which is the second component of curve 3L, is also applied from network 81 to control electrodes 104 and 105. The negative signal applied to control electrode 104 has no effect on device 77 whereas the signal impressed on control electrode 105 biases device 78 to cut-off which renders device 77 conductive. The actuator thus assumes its second operating condition. The next pulse of the transposed combination, which is the second component of the curve 3M is applied from network 83 to control electrode 105 but has no effect since device 78 is cut-off. The next pulse of the original combination, a burst of signal of frequency $f_4$, is applied to ground through switch element 74 and does not reach actuator 103. The final pulse of the transposed combination is the last component of curve 3L and is applied from network 81 to control electrodes 104 and 105. It triggers the circuit to its first operating condition.

The resulting signal obtained from device 78 of bi-stable actuating device 103 (curve 3N) is applied to coder 12 over conductors 100 as a deflection-control signal. The amplitude excursions of this signal shift the beam of coder 12 and the amplitude level of the signal at the conclusion of the response of actuator 103 to the transposed code combination determines the operating mode of the system until the next succeeding mode-determining interval at which time the aforedescribed mode-determining process is repeated. In view of the random manner in which the frequency components may appear in the original combination (curve 3J), it is apparent that the mode-determining process causes the operating mode of the system to change from time to time in accordance with a random coding schedule. As a consequence, the transmission is coded.

In order that subscriber receivers may utilize the coded transmission, it is necessary that the combination of code signal components developed by beam-deflection device 38 and its associated circuitry be made known to such subscriber receivers. To that end, the code signal combination (curve 3J) is applied to mixer amplifier 13 at the same time it is delivered to transposer 70 to be combined with the composite video signal for transmission to subscriber receivers. The bursts of various signal frequencies, which constitute the code signal, occur between the line-drive pulses superimposed on the vertical-blanking pulse, and therefore it is desirable that the amplitude level of the blanking pulse be modified to effect an inward modulation of the blanking pulse by the coding signal components. To that end, the pulses shown in curves 3F and 3I are supplied to synchronizing-signal generator 19 over conductor 34 to produce suitable modulating pulses which, in turn, are supplied to mixer amplifier 13 over conductors 20 to downward modulate the vertical blanking pulse at the appropriate times. Inasmuch as the time duration of the modulating pulses should equal the duration of the signal bursts (curve 3J) and will therefore exceed the duration of the actuating pulses shown in curves 3I and 3F, signal generator 19 may include a timing device, such as a mono-stable multivibrator, to develop such modulating pulses of selected time duration in response to the actuating pulses. The effect of the application of these modulating pulses and the code signal components to the mixer amplifier 13 is readily apparent by observing the wave form of the radiated composite video signal shown in curve O.

It should be mentioned at this time that in the particular illustration the code signal components are produced during a portion of the vertical-retrace interval so that mode changes will be effected between field-trace intervals. However, it should be understood that the code signal could be developed and utilized throughout the field-trace intervals to effect mode changes at a faster-than-field rate, if so desired.

The receiver of Figure 4, which may utilize the telecast originating at the transmitter of Figures 1 and 2, comprises a radio-frequency amplifier 110 having input terminals connected to an antenna circuit 111, 112 and output terminals connected to a first detector 113, the output terminals of the detector being connected to an intermediate-frequency amplifier 114. The output terminals of the intermediate-frequency amplifier are connected through a second detector 115 to a video amplifier 116 which, in turn, is coupled through a secrecy mechanism or decoder 117 to the input electrodes 118 of a cathode-ray image-reproducing device 121. Decoder 117 may be similar to coder 12 at the transmitter except that it is controlled to operate in a complementary fashion in order effectively to compensate for the variations in the timing of the received television signal.

Second detector 115 is also coupled through a synchronizing-signal separator 122 to a field-sweep system 123 and a line-sweep system 124. The output terminals of sweep systems 123 and 124 are connected respectively to field-deflection elements 120 and line-deflection elements 119, associated with reproducing device 121.

Field-drive pulses derived from synchronizing-signal separator 122 are supplied to a mono-stable multivibrator 125 having output terminals connected to a normally-closed gated amplifier 126. The output terminals of second detector 115 are also connected to gated amplifier 126 to supply the composite video signal thereto, and the output circuit of this amplifier is completed through a sectionalized primary winding of a transformer 138 to a source of unidirectional operating potential 127. A series of secondary windings of the transformer constitute the inductive portions of a series of frequency-selective tuned circuits 131—137, individually resonant at a particular one of the seven frequencies employed in coding. Selectors 131 to 136 are connected via associated diode rectifiers 141—146 to a series of switching elements 151—156 while selector 137 is directly connected via a reset connection 182 to a parallel resistance-capacitance load circuit 161. Switching elements 151—156 constitute a transposition mechanism 158, similar to mechanism 70 of the transmitter, provided to connect any one of the selectors 131—136 to any one of three parallel resistance-capacitance load circuits 160, 161, 162 or to ground.

Load circuit 160 is connected via conductor 184 and a pair of isolating diodes 165, 164 to the control electrodes 178 and 179 of a pair of electron-discharge devices 171 and 172, respectively, of an actuator 183. These control electrodes are connected to ground through resistors 167 and 168, respectively. Load circuits 161 and 162 are connected to control electrodes 178, 179 of devices 171, 172, respectively, via conductors 185, 180 and isolating diodes 163 and 166. The anode of device 171 is cross-coupled to the control electrode 179 of device 172 through a resistor 175 and the anode of device 172 is cross-coupled to the control electrode 178 of device 171 through a resistor 176. The anodes of devices 171, 172 are also connected through resistors 173 and 174, respectively, to a source of unidirectional operating potential 177 and the cathodes of the devices are connected in common through the parallel combination of a resistor 170 and a capacitor 169 to a ground connection. The anode of device 172 is connected to secrecy mechanism 117 over conductors 181 to provide an actuating or deflection-control signal therefor. The decoding arrangement shown in Figure 4, comprising the frequency-selective circuits, the transposition mechanism and the bi-stable actuating circuit is identical to the corresponding arrangement shown in Figure 2.

In operation, the coded television signal from the transmitter of Figures 1 and 2 is intercepted by antenna circuit 111, 112, amplified by radio-frequency amplifier 110 and heterodyned to the selected intermediate-frequency of the receiver in first detector 113. The resulting intermediate-frequency signal is amplified in intermediate-frequency amplifier 114 and detected in second detector 115 to produce a composite video signal. This latter signal is amplified in video amplifier 116 and impressed on the input electrodes 118 of image reproducing device 121 through secrecy mechanism or decoder 117 to control the intensity of the cathode-ray beam of the device in well known manner.

The synchronizing components are separated in separator 122, the field-synchronizing components being utilized to synchronize sweep system 123 and, hence, the field scansion of image-reproducing device 121, whereas the line-synchronizing components are utilized to synchronize sweep system 124 and, therefore, the line scansion of device 121. Of course, the sound modulated carrier received along with the video carrier is translated in the usual way through an audio system which has been omitted from the drawings for purposes of simplicity.

Field-drive pulses from separator 122 are supplied to mono-stable multivibrator 125 to produce a gating pulse shown in curve 3P for normally-closed gated amplifier 126. The parameters of the multivibrator are so chosen as to overlap, in point of time, that portion of the field-retrace interval of the composite video signal (curve 3O) which includes the reset pulse and the other encoding signal pulses. The composite video signal is continuously applied to the input circuit of amplifier 126 but only the information contained during the interval of the gating pulse (curve 3P) is translated to the primary winding of transformer 138. Amplifier 126 is thus "open" during the times the signal bursts of various frequencies, representing the combination of coding signal pulses, are received and consequently such bursts are separated out by the selector circuits 131—137 in the same manner as in the transmitter. When the various switching elements 151—156 of transposition mechanism 158 are adjusted to the same setting as transposition mechanism 70 at the transmitter, the input circuits of bi-stable actuating device 183 receive the identical pulses received by the corresponding input circuits of bi-stable actuating device 103 of the transmitter to produce an actuating or deflection-control signal for decoder 117 identical in wave form to curve 3N. Decoder 117 therefore operates in time coincidence with coder 12 at the transmitter so that the signal applied to electrodes 118 of image-reproducing device 121 is suitably compensated to effect proper image intelligibility.

In the described operation of the system, a reset pulse is presented to establish the actuating mechanism in a reference condition at the start of each mode-determining interval. If desired, the reset pulse may be generated and employed only after a series of such intervals. This has the advantage that in each such interval, other than those introduced by a reset pulse, the past history of the arrangement is a factor in determining the operating mode established for the system. For example, a given transposed combination of coding pulses may result in creating one operating mode if it is applied with the actuating mechanism in a particular one of its several stable operating conditions. And yet, the same transposed combination of coding pulses may result in the establishment of a different operating mode if applied when the actuating mechanism is in another of its stable conditions. This past history concept is disclosed and claimed in copending continuation-in-part application Serial No. 436,121, filed June 11, 1954, in the name of Jack E. Bridges, and assigned to the present assignee.

The combination of noise generator 35 and device 38 in imposing a random sequence of operation upon generators 41—46 during mode-determining intervals is particularly advantageous because of the random nature of the selection. Alternatively, any conventional multiplexing mechanism may be employed to develop the combination of code pulses in an adjustable or changing sequence in point of time.

The invention provides, therefore, an improved subscription television system in which a combination of randomly-sequenced code signal components, individually having a predetermined identifying characteristic and collectively determining a code schedule, is developed which may be distributed to subscriber receivers along with the video information while maintaining sufficient secrecy. The invention also provides an extremely simple and novel circuit for utilizing such an encoding signal to effect mode changes in the television system.

While a particular embodiment of the invention has been shown and described, modifications may be made, and it is intended in the appended claims to cover all such modifications as may fall within the true spirit and scope of the invention.

I claim:

1. A subscription television system for translating a television signal comprising: a secrecy mechanism having a plurality of operating conditions each of which establishes a different operating mode in said system; a multi-stable actuating device for said secrecy mechanism having at least two stable operating conditions and effectively including a plurality of electron-discharge paths cross-coupled, one to another, to render said paths conductive one at a time in a controlled sequence; at least three input circuits included in said actuating device for differently controlling the respective conductive conditions of said discharge paths to determine the operating condition of said actuating device; means for deriving a combination of code signal components individually having a predetermined identifying characteristic and collectively determining a code schedule; means responsive to said identifying characteristics for separating said code signal components from one another; and means for applying the separated signal components to said input circuits in a prescribed sequence to actuate said actuating device for varying the operating condition of said secrecy mechanism.

2. A subscription television system for translating a television signal comprising: a secrecy mechanism having a plurality of operating conditions each of which establishes a different operating mode in said system; a bi-stable actuating device for said secrecy mechanism having two stable operating conditions in each of which said secrecy mechanism establishes a different operating mode in said system; at least three input circuits for said actuating device, individually differently responsive to an actuating signal to operate said device from one to the other of said aforesaid operating conditions; means for deriving a combination of code signal components individually having a predetermined identifying characteristic and collectively determining a code schedule; means responsive to said identifying characteristics for separating said code signal components from one another; and means for selectively applying the separated signal components to said input circuits in a prescribed sequence to actuate said actuating device for varying the operating condition of said secrecy mechanism.

3. A subscription television transmitter for transmitting a coded television signal comprising: a coding mechanism having a plurality of operating conditions each of which establishes a different operating mode in said transmitter; a multi-stable actuating device coupled to said coding mechanism for effecting actuation thereof and having at least two stable operating conditions in each of which said coding mechanism establishes a different operating mode in said transmitter; a plurality of input circuits for said actuating device, individually differently responsive to an actuating signal to operate said device from one to another of its aforesaid operating conditions; a series of signal generators for producing coding signal components; means for controlling the sequence of operation of said generators to establish a combination of coding signal components representing a coding schedule determined by the order of said components within said combination; and means for applying the coding signal components to said input circuits in a prescribed sequence to actuate said actuating device for varying the operating condition of said coding mechanism effectively to code said television signal.

4. A subscription television transmitter for transmitting a coded television signal comprising: a coding mechanism having a plurality of operating conditions each of which establishes a different operating mode in said transmitter; a multi-stable actuating device for said coding mechanism having at least two stable operating conditions and effectively including a plurality of electron-discharge paths cross-coupled, one to another, to render said paths conductive one at a time in a controlled sequence; at least three input circuits included in said actuating device for differently controlling the respective conductive conditions of said discharge paths to determine the operating condition of said actuating device; a series of signal generators for producing coding signal components individually having a predetermined identifying characteristic; means for controlling the sequence of operation of said generators to establish a combination of coding signal components representing a coding schedule determined by the order of said components within said combination; means responsive to said identifying characteristics for separating said coding signal components from one another; and means for selectively applying the separated signal components to said input circuits in a prescribed sequence to actuate said actuating device for varying the operating condition of said coding mechanism effectively to code said television signal.

5. A subscription television transmitter for transmitting a coded television signal comprising: a coding mechanism having a plurality of operating conditions each of which establishes a different operating mode in said transmitter; a multi-stable actuating device coupled to said coding mechanism for effecting actuation thereof and having at least two stable operating conditions in each of which said coding mechanism establishes a different operating mode in said transmitter; a plurality of input circuits for said actuating device, individually differently responsive to an actuating signal to operate said device from one to another of its aforesaid operating conditions; a series of signal generators for producing coding signal components individually having a predetermined identifying characteristic; means for controlling the sequence of operation of said generators to establish a combination of coding signal components representing a coding schedule determined by the order of said components within said combination; means for transmitting said combination of coding signal components to subscriber receivers; and means for selectively applying said coding signal components to said input circuits in a prescribed sequence to actuate said actuating device for varying the operating condition of said coding mechanism effectively to code said television signal.

6. A subscription television transmitter for transmitting a coded television signal comprising: a coding mechanism having a plurality of operating conditions each of which establishes a different operating mode in said transmitter; a multi-stable actuating device coupled to said coding mechanism for effecting actuation thereof and having at least two stable operating conditions in each of which said coding mechanism establishes a different operating mode in said transmitter; a plurality of input circuits for said actuating device, individually differently responsive to an actuating signal to operate said device from one to another of its aforesaid operating conditions; a series of signal generators for producing coding signal components individually having a predetermined frequency characteristic; means for controlling in random fashion the sequence of operation of said generators to establish a combination of coding signal components representing a coding schedule determined by the order of said components within said combination, said coding signal components thereby being randomly-sequenced and randomly-appearing within said combination; means for transmitting said combination of coding signal components to subscriber receivers; and means for selectively applying said coding signal components to said input circuits in a prescribed sequence to actuate said actuating device for varying the operating condition of said coding mechanism effectively to code said television signal.

7. In a subscription television system: a secrecy mechanism having a plurality of operating conditions each of which establishes a different operating mode in said system; a multi-stable actuating device for said secrecy mechanism having at least two stable operating conditions and effectively including a plurality of electron-discharge paths cross-coupled, one to another, to render said paths conductive one at a time in a controlled sequence; at least three input circuits included in said actuating device for differently controlling the respective conductive conditions of said discharge paths to determine the operating condition of said device; at least one output circuit included in said actuating device for deriving an output signal having amplitude variations determined by changes in the operating condition of said device; a source for supplying code signals having characteristic variations in accordance with a coding schedule; means for applying said code signals from said source to said input circuits in a prescribed sequence to actuate said actuating device; and means for utilizing the output signal of said output circuit to vary the operating condition of said secrecy mechanism to effect corresponding mode changes in said system.

8. In a subscription television system: a secrecy mechanism having at least two operating conditions each of which establishes a different operating mode in said system; a bi-stable actuating device coupled to said secrecy mechanism for effecting actuation thereof and having two stable operating conditions in each of which said secrecy mechanism establishes a different operating mode in said system; a first input circuit for said actuating device responsive to an applied pulse for actuating said device to one of its aforesaid operating conditions; a second input circuit for said actuating device responsive to an applied pulse for actuating said device to the other one of its aforesaid operating conditions; a third input circuit for said actuating device responsive to an applied pulse for actuating said device from its instantaneous condition to its alternate condition; means for deriving a number of control pulses in accordance with a code schedule of said system; and means for selectively applying said control pulses to certain ones of said input circuits to effect actuation of said actuating device.

9. In a subscription television system: a secrecy mechanism having at least two operating conditions each of which establishes a different operating mode in said system; a bi-stable actuating device coupled to said secrecy mechanism for effecting actuation thereof and having two stable operating conditions in each of which said secrecy mechanism establishes a different operating mode in said system; a first input circuit for said actuating device responsive to an applied pulse for actuating said device to one of its aforesaid operating conditions; a second input circuit for said actuating device responsive to an applied pulse for actuating said device to the other one of its aforesaid operating conditions; a third input circuit for said actuating device responsive to an applied pulse for actuating said device from its instantaneous condition to its alternate condition; means for deriving during each of a series of mode-determining intervals a number of control pulses in accordance with a code schedule of said system; means for selectively applying said control pulses to certain ones of said input circuits to effect actuation of said actuating device; a reset circuit for deriving a reset pulse; and means for connecting said reset circuit to one of said first and second input circuits to establish said actuating device at a reference condition at the beginning of each mode-determining interval.

10. A subscription television receiver for utilizing a television signal coded in accordance with a coding schedule, said receiver comprising: an image-reproducing device; circuit means for controlling said reproducing device in accordance with said coded television signal; a decoding mechanism having a plurality of operating conditions each of which establishes a different operating mode in said receiver; a multi-stable actuating device for said decoding mechanism having at least two stable operating conditions and effectively including a plurality of electron-discharge paths cross-coupled, one to another, to render said paths conductive one at a time in a controlled sequence; at least three input circuits included in said actuating device for differently controlling the respective conductive conditions of said discharge paths to determine the operating condition of said actuating device; means for deriving a combination of code signal components representing at least a portion of said coding schedule; and means for applying the signal components to said input circuits in a prescribed sequence to actuate said actuating device for varying the operating condition of said decoding mechanism effectively to decode said television signal.

11. A subscription television receiver for utilizing a television signal coded in accordance with a coding schedule, said receiver comprising: an image-reproducing device; circuit means for controlling said reproducing device in accordance with said coded television signal; a decoding mechanism having a plurality of operating conditions each of which establishes a different operating mode in said receiver; a bi-stable actuating device for said decoding mechanism having two stable operating conditions in each of which said decoding mechanism establishes a different operating mode in said receiver; at least three input circuits for said actuating device, individually differently responsive to an actuating signal to operate said device from one to the other of its aforesaid operating conditions; means for deriving a combination of code signal components individually having a predetermined identifying characteristic and collectively representing at least a portion of said coding schedule; means responsive to said identifying characteristics for separating said code signal components from one another; and means for selectively applying the separated signal components to said input circuits in a prescribed sequence to actuate said actuating device for varying the operating condition of said decoding mechanism effectively to decode said television signal.

12. A subscription television receiver for utilizing a television signal coded in accordance with a coding schedule and including a combination of code signal components, individually having a predetermined frequency characteristic, related to said coding schedule, said receiver comprising: a decoding mechanism having a plurality of operating conditions each of which establishes a different operating mode in said receiver; a bi-stable actuating device for said decoding mechanism having two stable operating conditions in each of which said decoding mechanism establishes a different operating mode in said receiver; at least three input circuits for said actuating device, individually differently responsive to an actuating signal to operate said device from one to the other of its aforesaid operating conditions; means for deriving said combination of code signal components from said television signal; means for separating said code signal components from one another; and means for selectively applying the separated signal components to said input circuits in a prescribed sequence to actuate said actuating device for varying the operating condition of said decoding mechanism effectively to decode said television signal.

13. In a subscription television system: a secrecy mechanism having a plurality of operating conditions each of which establishes a different operating mode in said system; a multi-stable actuating device coupled to said secrecy mechanism having a plurality of operating conditions, at least some of which are effective to establish said secrecy mechanism in assigned ones of its aforesaid operating conditions; at least three input circuits included in said actuating device and individually differently responsive to an actuating signal to operate said actuating device from one to another of its aforesaid operating conditions; means for deriving a combination of code signal components individually having a predetermined identifying characteristic and collectively determining a code schedule; and means coupled to said last-mentioned means and to said input circuits for utilizing said code signal components to apply actuating signals to said input circuits for effecting actuation of said actuating device between its aforesaid operating conditions to vary the operating condition of said secrecy mechanism.

14. A subscription television system for translating a television signal comprising: a secrecy mechanism having a plurality of operating conditions each of which establishes a different operating mode in said system; a multistable actuating device for said secrecy mechanism having at least two stable operating conditions and effectively including a plurality of electron-discharge paths cross-coupled, one to another, to render said paths conductive one at a time in a controlled sequence; at least three input circuits included in said actuating device and individually responsive to an applied actuating signal for differently controlling the respective conductive conditions of said discharge paths to determine the operating condition of said actuating device; means for deriving a combination of code signal components individually having a predetermined identifying frequency and collectively determining a code schedule in accordance with their order within said combination; and means coupled to said last-mentioned means and to said input circuits for utilizing said code signal components in a prescribed sequence to apply actuating signals to said input circuits for effecting actuation of said actuating device to vary the operating condition of said secrecy mechanism.

References Cited in the file of this patent

UNITED STATES PATENTS

| | | |
|---|---|---|
| 2,414,101 | Hogan et al. | Jan. 14, 1947 |
| 2,472,774 | Mayle | June 7, 1949 |
| 2,656,407 | Herrick et al. | Oct. 20, 1953 |
| 2,664,260 | Roschke | Dec. 29, 1953 |